US009135022B2

(12) United States Patent
Allyn et al.

(10) Patent No.: US 9,135,022 B2
(45) Date of Patent: Sep. 15, 2015

(54) CROSS WINDOW ANIMATION

(75) Inventors: Barry Christopher Allyn, Snohomish, WA (US); Tyler Robert Adams, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 307 days.

(21) Appl. No.: 13/295,376

(22) Filed: Nov. 14, 2011

(65) Prior Publication Data

US 2013/0120444 A1 May 16, 2013

(51) Int. Cl.
*G06T 13/00* (2011.01)
*G06F 9/44* (2006.01)

(52) U.S. Cl.
CPC .............. *G06F 9/4443* (2013.01); *G06T 13/00* (2013.01)

(58) Field of Classification Search
USPC .......................................................... 345/473
See application file for complete search history.

(56) References Cited

U.S. PATENT DOCUMENTS 6,008,809 A 12/1999 Brooks
6,054,989 A * 4/2000 Robertson et al. ............ 715/848
7,168,048 B1 1/2007 Goossen et al.
7,302,648 B1 11/2007 Brunner et al.
7,316,032 B2 1/2008 Amad
7,559,034 B1 * 7/2009 Paperny et al. ............... 715/803
7,703,036 B2 4/2010 Satterfield et al.
2002/0008703 A1 * 1/2002 Merrill et al. ................ 345/473
2003/0163724 A1 * 8/2003 Tayebi et al. ................. 713/200
2004/0012717 A1 * 1/2004 Sprague et al. ............... 348/564
2004/0100501 A1 5/2004 Dornback (Continued)

FOREIGN PATENT DOCUMENTS

CN 101416144 A 4/2009
JP 11-184596 7/1999
WO 2004-114113 12/2004

OTHER PUBLICATIONS

Vasko "Extended Window Manager Hints" http://standards.freedesktop.org/wm-spec/wm-spec-1.3.html#id2731465 [Site Visited Sep. 19, 2013 11:14:18 AM] pp. 1-32 of PDF May 2005.*

(Continued)

*Primary Examiner* — Daniel Hajnik
(74) *Attorney, Agent, or Firm* — Steven Crocker; Danielle Johnston-Holmes; Micky Minhas

(57) ABSTRACT

Animations may cross different windows. These cross window animations may include interwindow animations and/or window transition animations. Interwindow animations are used to animate elements across windows. Window transitions are used to animate moving/resizing/showing/hiding windows simultaneously. To perform these animations, an overlay window covers the animation area that includes at least a portion of two different windows. Layers may be used to represent images or visual elements that can be moved as part of an animation. These layers may be placed in the animation overlay window to move visual elements across the underlying windows. Supported underlying windows are directed to draw content directly to the overlay window during the animation. A picture of the underlying window is drawn to the animation overlay window when the underlying window is not-supported such that the underlying window is included within the animation. When the animation is complete, the animation overlay window is removed.

20 Claims, 10 Drawing Sheets

310
User Interface Window 302
Element 312
Overlay Window 320
Element 312
Application Window 304
Document Window 306
Application Window 308

350
User Interface Window 352 (before animation)
User Interface Window 352' (after animation)
Overlay Window 360
Document Window 356' (after animation)
User Interface Window 364
Document Window 356
Application Window 368
UI Element 362

(56) References Cited

U.S. PATENT DOCUMENTS

| | | | | |
|---|---|---|---|---|
| 2005/0022131 | A1 * | 1/2005 | Saint-Hilaire et al. | 715/740 |
| 2008/0231627 | A1 * | 9/2008 | Shearer | 345/419 |
| 2011/0119608 | A1 | 5/2011 | Van Ieperen | |
| 2011/0167364 | A1 * | 7/2011 | Pentikainen et al. | 715/764 |
| 2011/0214079 | A1 | 9/2011 | Young | |
| 2013/0113802 | A1 * | 5/2013 | Weersink et al. | 345/427 |

OTHER PUBLICATIONS

"Good or evil—SetParent() win32 API between different processes" by Bernard Vandar Beken http://stackoverflow.com/questions/3459874/good-or-evil-setparent-win32-api-between-different-processes Stack Overflow p. 1 Aug. 2010.*

Apple, Inc.; "Animation Programming Guide for Cocoa", Published on: May 23, 2006, Available at: http://developer.apple.com/library/mac/documentation/Cocoa/Conceptual/AnimationGuide/AnimationGuide.pdf.

MSDN; "WPF Interoperation: "Airspace" and Window Regions Overview", Retrieved on: Sep. 7, 2011, Available at: http://msdn.microsoft.com/en-us/library/aa970688%28VS.90%29.aspx.

MSDN; "Threading Model", Retrieved on: Sep. 7, 2011, Available at: http://msdn.microsoft.com/en-us/library/ms741870.aspx.

U.S. Appl. No. 13/152,133, filed Jun. 2, 2011, entitled "Global composition system"; Silvana Moncayo, et al.

U.S. Appl. No. 13/229,474, filed Sep. 9, 2011, entitled "Buffer display techniques"; Silvana Moncayo, et al.

U.S. Appl. No. 13/229,810, filed Sep. 12, 2011, entitled "Application programming interface for a bitmap"; Silvana Moncayo, et al.

U.S. Appl. No. 13/229,627, filed Sep. 9, 2011, entitled "Composition system thread"; Silvana Moncayo, et al.

International Search Report, mailed Mar. 21, 2013, in PCT/US2012/064259.

"First Office Action and Search Report Issued in Chinese Patent Application No. 201210453987.3", Mailed Date: Aug. 21, 2014, 13 Pages.

"Second Office Action Received for China Patent Application No. 201210453987.3", Mailed Date: Apr. 27, 2015, 8 pages.

* cited by examiner

810

820

Click to add title

Click to add subtitle

850

820'

860

Recent Documents

Themes

Save

Save as

Print

Share

Properties

START

RECENT

HELP

ACCOUNT

Mylar

Kilter

URBAN POP

TRADESHOW

*Fig.8.*

CROSS WINDOW ANIMATION

BACKGROUND

Many applications use animations to enrich a user experience. For example, animations may be performed in response to a user selecting a user interface element, advancing to a next slide, opening/closing a document, changing a view, and the like. These animations are performed within a window of the application. For example, one animation may be performed within a user interface window and another animation may be performed within a document window. Often it is desirable to create animations that move, resize, or cross these windows. These types of animations, however, can be difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Animations may cross different windows. These cross window animations may include interwindow animations and/or window transition animations. Interwindow animations are used to animate elements across windows. Window transitions are used to use animation to move/resize/show/hide windows simultaneously. To perform these animations, an overlay window is created to cover the animation area that includes at least a portion of different windows. Layers may be used to represent images or visual elements that can be moved as part of an animation. These layers may be placed in the animation overlay window to move visual elements across the underlying windows. Supported underlying windows are directed to draw content directly to the overlay window during a time of the animation. A picture of the underlying window is drawn to the animation overlay window when the underlying window is not-supported such that the underlying window is included within the animation. When the animation is complete, the animation overlay window may be removed.

BRIEF DESCRIPTION OF THE DRAWINGS

FIGS. 7-10 show exemplary displays illustrating cross window animations.

DETAILED DESCRIPTION

Figure 1:
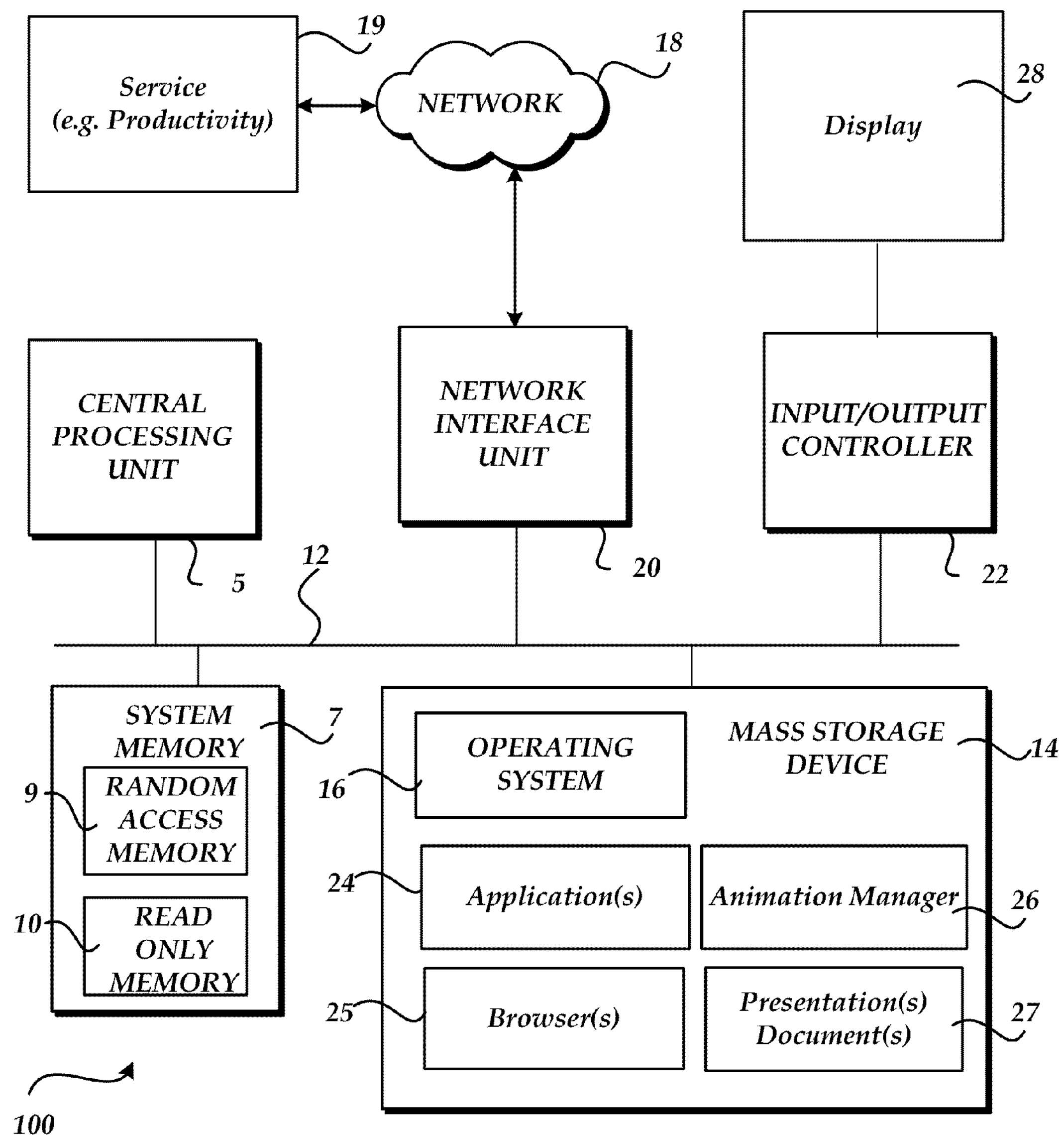
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, presentation(s)/document(s) 27, and other program modules, such as Web browser 25, and animation manager 26, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications, such as an animation manager 26, productivity applications 24 (e.g. a presentation application such as MICROSOFT POWERPOINT® a word-processing application such as MICROSOFT WORD®, a messaging application such as MICROSOFT OUTLOOK®, a spreadsheet application such as MICROSOFT EXCEL®, and the like), and may store one or more Web browsers 25. The Web browser 25 is operative to request, receive, render, and provide interactivity with electronic content, such as Web pages, videos, documents, and the like. According to an embodiment, the Web browser comprises the INTERNET EXPLORER® Web browser application program from MICROSOFT CORPORATION.

Animation manager 26 may be located on a client device and/or on a server device (e.g. within service 19). Animation manager 26 may be configured as an application/process and/or as part of a cloud based multi-tenant service that provides resources (e.g. services, data . . . ) to different tenants (e.g. MICROSOFT OFFICE 365™, MICROSOFT WEB APPS™, MICROSOFT SHAREPOINT® ONLINE).

Generally, animation manager 26 is configured to perform animations that cross different windows. These cross window animations may include interwindow animations and/or window transition animations. Interwindow animations are used to animate elements across windows and/or window transitions are used to move/resize/show/hide windows simultaneously. An interwindow animation is generally used when a visual element or layer is animated from one window to another. To perform the interwindow animation, a transparent overlay window may be located over the windows that the visual element moves between. The visual element is then animated in the transparent overlay across the two windows. A window transition is generally used when you want to use animation to move, resize, or show/hide a window. To perform the window transition animation, an overlay window may be located on top of the underlying windows to be animated and the content of these windows is redirected into the overlay window in order to animate their content. Layers may be used to represent images or visual elements that can be moved as part of an animation. These layers may be placed in the animation overlay window to move visual elements across the underlying windows. Supported underlying windows are directed to draw content directly to the overlay window during a time of the animation. A picture of the underlying window is drawn to the animation overlay window when the underlying window is not-supported such that the underlying window is included within the animation. When the animation is complete, the animation overlay window may be removed. Additional details regarding the operation of animation manager 26 will be provided below.

Figure 2:
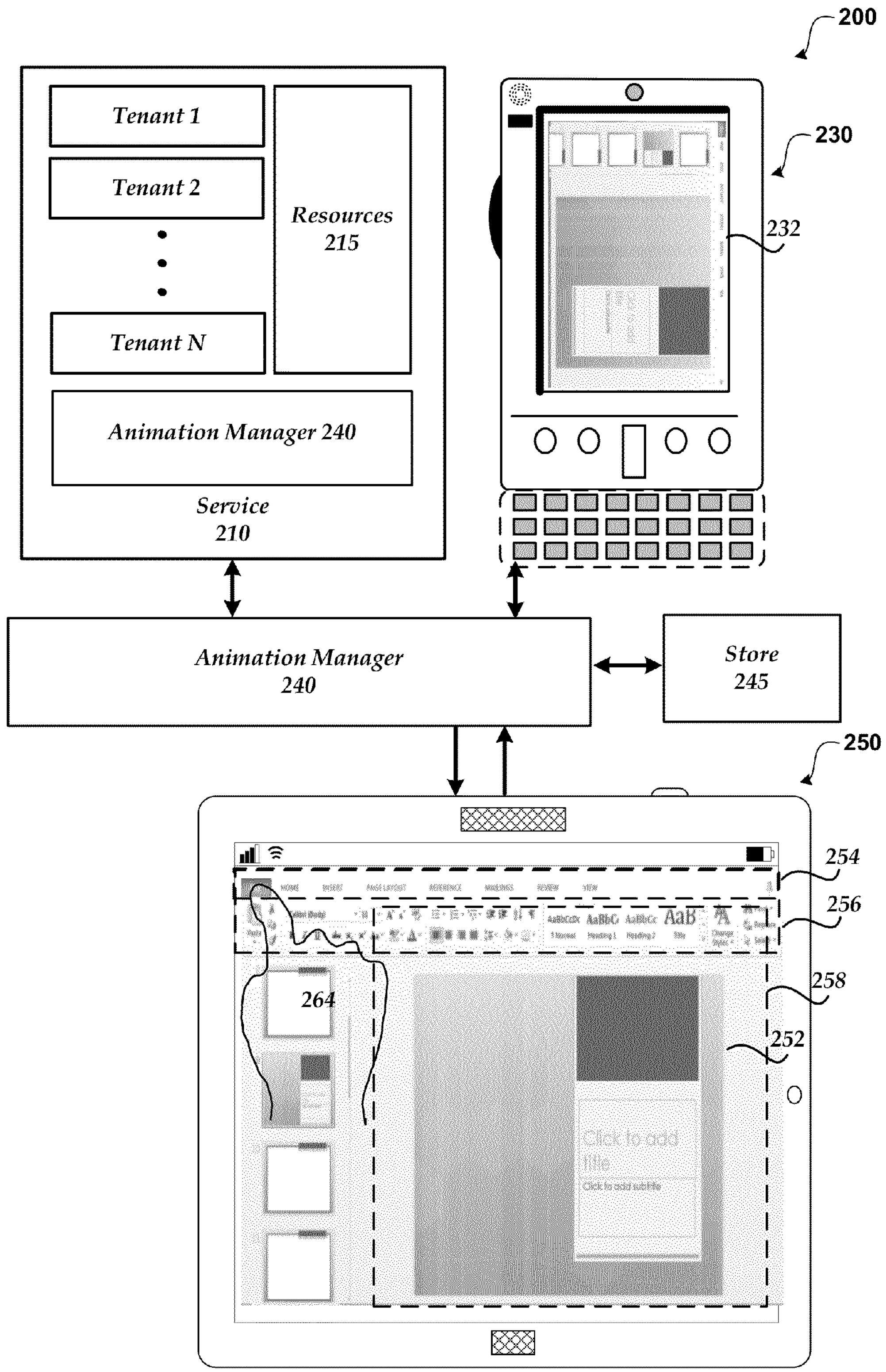
FIG. 2 illustrates an exemplary system for performing cross window animations.

FIG. 2 illustrates an exemplary system for performing cross window animations. As illustrated, system 200 includes service 210, animation manager 240, store 245, touch screen input device/display 250 (e.g. slate) and smart phone 230.

As illustrated, service 210 is a cloud based and/or enterprise based service that may be configured to provide productivity services (e.g. MICROSOFT OFFICE 365™, MICROSOFT WEB APPS™, MICROSOFT POWERPOINT®). Functionality of one or more of the services/applications provided by service 210 may also be configured as a client based application. For example, a client device may include an application that performs animations that may cross different windows. Although system 200 shows a productivity service, other services/applications may be configured to perform cross window animations.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data.

System 200 as illustrated comprises a touch screen input device/display 250 (e.g. a slate/tablet device) and mobile phone 230 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 250 and mobile device 230 shows an exemplary display 252/232 of a presentation slide. Mobile phone 230 shows display 232 before a display of user interface element 256. Animation manager 240 is configured to perform cross window animations that may include interwindow animations and/or window transition animations. Interwindow animations animate one or more visual elements over different windows (e.g. opening up a menu, moving an object across different windows, and the like). A window transition is generally used when you want to use animation to move, resize, or show/hide a window. In the current example, a user 264 has selected the file menu option in user interface window 254 to display the user interface elements in window 256. In response to selecting the file menu option, a window transition animation is performed that appears to smoothly resize the user interface window from original size 254 to expanded size 256 while also shrinking the document display window 258 to a smaller document display window 252. The underlying windows may position/resize the windows at any time during/before the animation.

Animation manager 240 creates an overlay window that covers the portion of the different windows where the animation is to occur (the animation area). The animation area may be configured to include a portion of different windows or configured to cover an entire display area. For example, the animation area may be configured to include application windows that are associated with one or more applications as well as a desktop area and other user interface elements (e.g. a start bar). Generally, the animation area is set to a size such that the animation when performed is contained within the animation area. Some windows may use a rendering method that supports drawing content to the overlay window (supported window). Other windows may not be able to draw content directly to the overlay window (non-supported window). Supported windows that are within the animation area are directed to draw content directly to the overlay window during the animation. In this way, any effects/animations that are being performed in the underlying window show up in the animation (e.g. cursor blinking, text effect being applied to underlying content . . . ). A picture of any non-supported windows may be drawn to the animation overlay such that the non-supported window is included within the animation. When the animation is complete, the overlay window may be removed and the underlying windows are viewable by the user.

Figure 3:
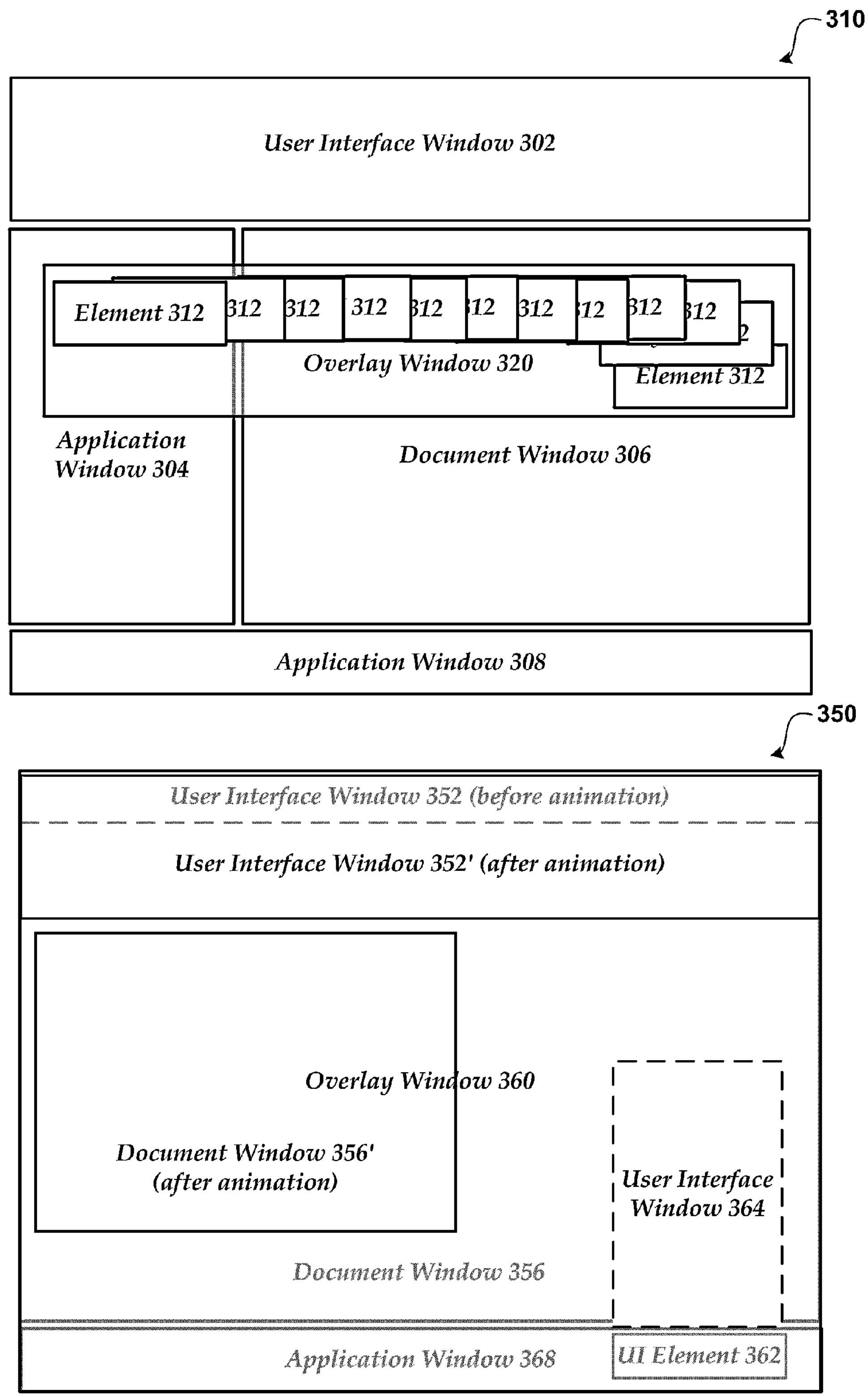
FIG. 3 shows exemplary displays showing an interwindow animation and a windows transition animation.

FIG. 3 shows exemplary displays showing an interwindow animation and a windows transition animation.

Display 310 shows an interwindow animation that crosses two different underlying windows. As illustrated, display 310 includes a user interface window 302, an application window 304, a document window 306, an application window 308, and an overlay window 320. A cross window animation may include one or more interwindow animations and/or one or more window transition images.

In the current example illustrated in display 310, an animation of element 312 appears to start in application window 304 and continues to animate across document window 306. The animation may cross one or more applications (e.g. moving an element to a trash can that is displayed on a desktop from an application). The animation may also include performing other effects (e.g. resizing, fading in/out, changing one or more display characteristics and the like).

Overlay window 320 is created to cover the animation area that crosses the different windows. Overlay window 320 is sized such that the animation is contained within the size of the overlay window 320. One or more layers may be placed over the overlay window to move visual elements (e.g. element 312) across the underlying windows. As discussed above, supported underlying windows are directed to draw content directly to the overlay window during the time of the animation. According to an embodiment, the parent of the layers from the underlying windows are changed to the overlay window during the time of the animation. A picture of any non-supported windows may be drawn to the animation overlay such that the non-supported window is included within the animation. According to an embodiment, when the animation is complete, overlay window 320 is removed. More details regarding interwindow animation are provided in FIG. 3 and below.

Display 350 shows an exemplary window transition animations. As illustrated, display 350 includes user interface window 352/352', document window 356/356', overlay window 360, application window 368, UI element 362 and user interface window 364. Overlay window 360 is sized to cover the animation area that includes user interface window 352, document window 356 and application window 368. The current example shows an animation where user interface window 352 is resized to a larger size (window 352'), document window 356 is resized smaller and moved to a different location (window 356') and a user interface window 364 is displayed. According to an embodiment, the windows that are affected by the display of the animation are registered with the animation manager. Registering the windows is directed at improving the performance of the animation and system by excluding the windows that are not affected by the animation in the various animation operations. A process/application may provide hints to the animation manager to assist in setting animation parameters (e.g. initial/final window size/location/visibility, clipping regions, content static, and the like). As discussed above, the underlying windows may be directed to draw directly to overlay window 360 when supported. According to an embodiment, while the animation is playing the window is blocked from receiving input from a user. More details regarding interwindow animation are provided in FIG. 4 and below.

Figure 4:
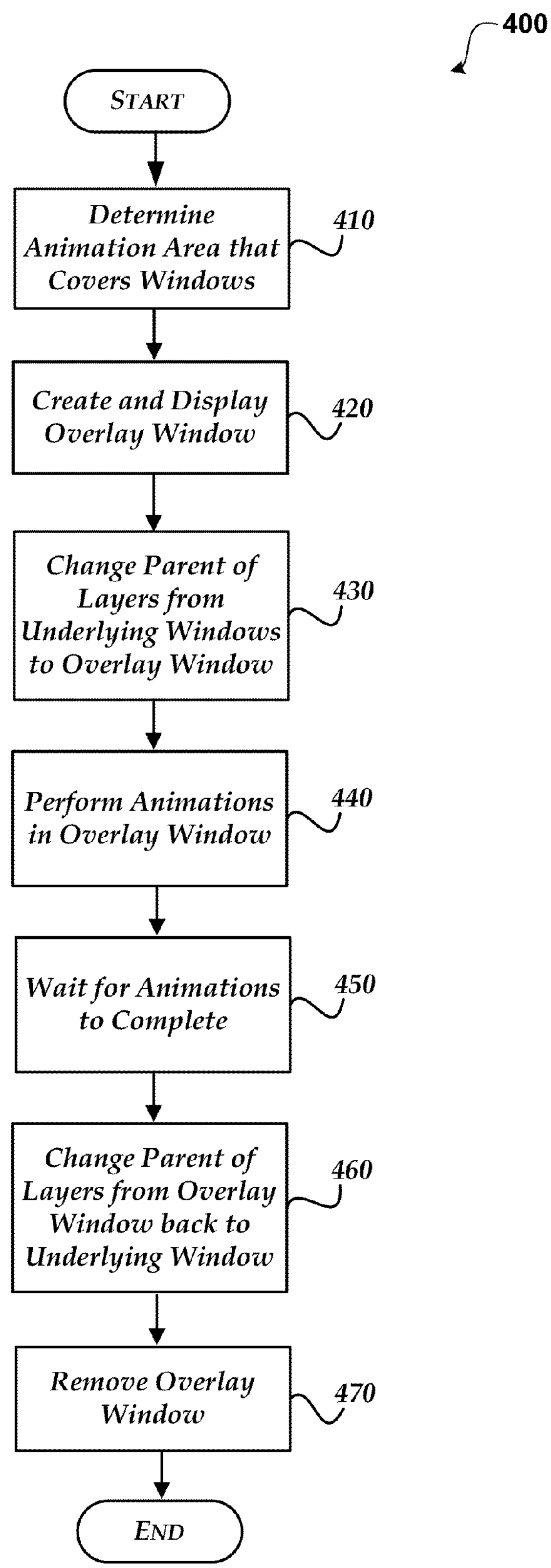
FIG. 4 shows a process for cross window animation using an overlay window to animate a layer between different windows.
Figure 5:
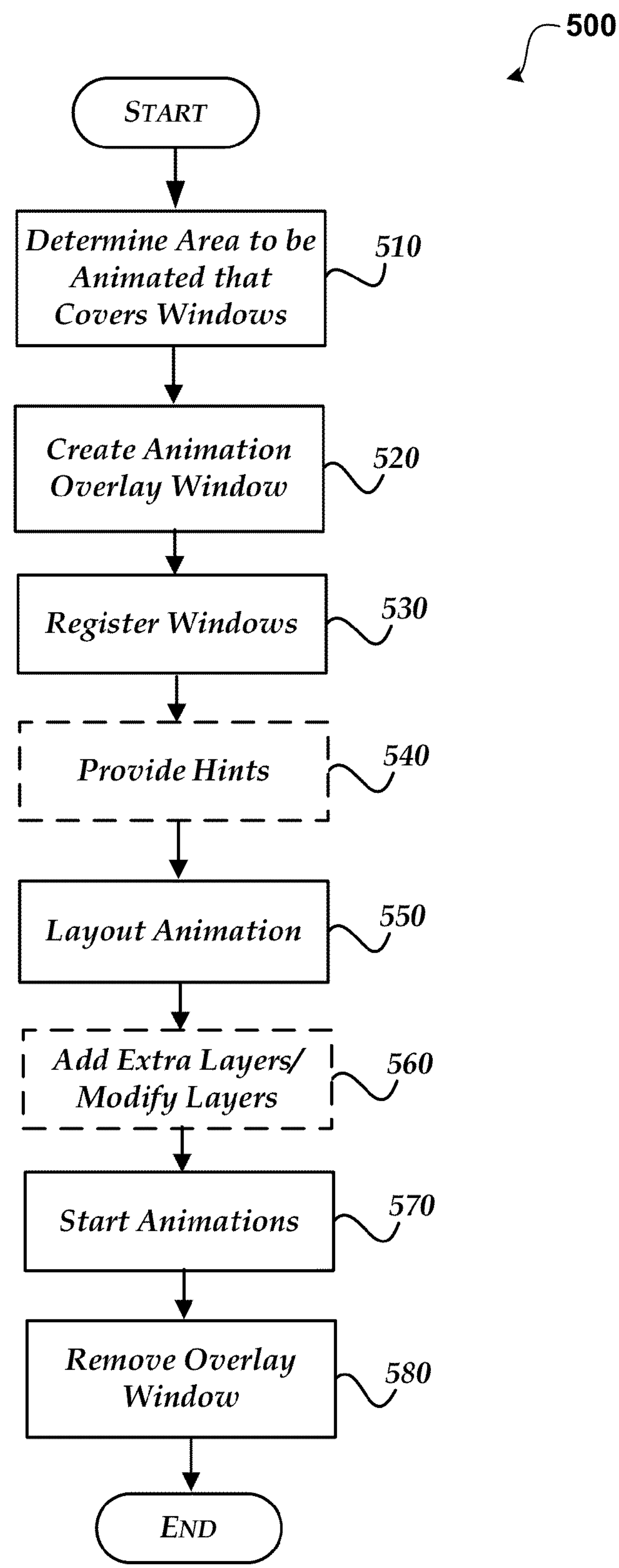
FIG. 5 shows a process for cross window animation including moving/resizing different windows using an overlay window.

FIGS. 4-5 show illustrative processes for cross window animation. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the ordering of the operations may change and be performed in other orderings.

FIG. 4 shows a process for cross window animation using an overlay window to animate a layer between different windows.

After a start operation, the process flows to operation 410, where the animation area is determined. The animation area is sized to cover the portions of the windows that are used during the cross window animation. The animation area may include windows from one or more applications/processes. For example, the animation are may cross two or more windows from a same application and/or from different applications. The animation area may include all/portion of a display.

Moving to operation 420, the overlay window is created and sized based on the determined animation area. According to an embodiment, the overlay window includes a transparent background that is displayed above the windows in the animation area.

Flowing to operation 430, the parent for the layers of the underlying windows is changed to the overlay window. The parent is changed for the duration of the performance of the animation.

Transitioning to operation 440, the animation(s) to be performed are scheduled and performed. According to an embodiment, a layer is moved into the overlay window, moved across the overlay window such that it crosses the windows that are beneath it, and then the layer is placed back (e.g. change the parent to the underlying window) into the underlying window where the animation ends.

Moving to operation 450, the process waits for the animations to complete. According to an embodiment, the animations may be made to be modal and/or an animation completed notification handler is configured to be used to provide a notification when the animations in the overlay have completed. During the animation time, the user interface thread for the underlying windows is blocked. Any received instructions that occur during this time may be stored and executed once the animation is complete. According to an embodiment, messages from an operating system continue to be processed during the animation. Timing parameters may be used to help ensure a responsive user interface such that a user is not stuck waiting on an animation to complete. For example, a computing device may have a graphics card that is not capable of quickly displaying animations. According to an embodiment, when it is estimated that an animation is going to take longer than a predetermined time to complete (e.g. 200, 300, 400, 500 milliseconds) the cross window animation is canceled.

Flowing to operation 460, the parent of the layers of the underlying windows are changed back to the underlying windows from the overlay window.

Transitioning to operation 470, the overlay window is removed from the display.

The process then moves to an end operation and returns to processing other actions.

FIG. 5 shows a process for cross window animation including moving/resizing different windows using an overlay window.

After a start operation, the process flows to operation 510, where the animation area is determined. The animation area is sized to cover the portions of the windows that are used during the cross window animation. The animation area may include windows from one or more applications/processes. For example, the animation may cross two or more windows from a same application and/or from different applications. The animation area may include all/portion of a display.

Moving to operation 520, the overlay window is created and sized based on the determined animation area. The overlay window may include an opaque background or a transparent background that is displayed above the windows in the animation area.

Flowing to operation 530, the windows that are affected by the cross window animation may be registered. According to an embodiment, regardless of whether a window is registered, windows that are visible during the animation are automatically redirected into the overlay window to help ensure that the overlay depicts an accurate picture of the underlying window tree. Registering specific windows allows clients to specify which windows are to be included in the animation. This helps to save processing time by reducing the number of windows processed during operation. For each registered window it takes time to redirect windows into the overlay window and/or to capture pictures of them to bring into the overlay window. Windows may be registered before and/or during the cross window animation. For example, windows may be registered during the animation when they are about to become visible.

Transitioning to operation 540, hints may be provided/received. Hints may be used to assist in correcting any behaviors that are not being performed correctly. Hinting may also be used to assist in avoiding changes to existing window layout code. For example, to achieve a slide in/out effect when a window is shown or hidden, the client provide hints that define an initial location and a final location for a window. Hinting may help to avoid unnecessary window event triggering and may remove interdependencies between window transition logic and the existing layout code. Many different type of hints may be provided to the animation manager. According to an embodiment, the hints include an initial location of the window, a final location of the window, an initial size of the window, a final size of the window, an initial visibility state of the window, a final visibility state of the window, a hint that specifies that the windows contents are a solid color, a hint that specifies that a window's contents will not change between initial and final states (that doesn't specify that the size of the window will not change, but instead that the contents painted into the client area are the same where they intersect), a hint that specifies that a window is a control (e.g. an ActiveX control), a hint that the window will not be seen (this helps to ensure that the window's image is not redirected during the animation, thereby avoiding a potentially expensive amount of work), a resize hint that adds extra area to the overlay region (e.g. a client may want to add more area to account for rotation or other transforms that will be applied manually to the redirected layers), and a clipping hint that is used to achieve a clipping effect as windows are transitioned.

Moving to operation 550, the layout of the windows and the animation are performed. The layers and properties on the layers are set to perform the animation.

Flowing to operation 530, extra layers may be added to the overlay window and/or existing layers may be modified. For example, an extra layer may be added to provide an additional animation effect. For example, a picture may be displayed at a certain point during the animation, a light source added, a sparkling effect, and the like may be added. An existing layer may be modified to create/change another desired animation effect.

Transitioning to operation 570, the cross window animations are performed using the overlay window.

Moving to operation 580, the overlay window is removed.

The process then moves to an end operation and returns to processing other actions.

Figure 6:
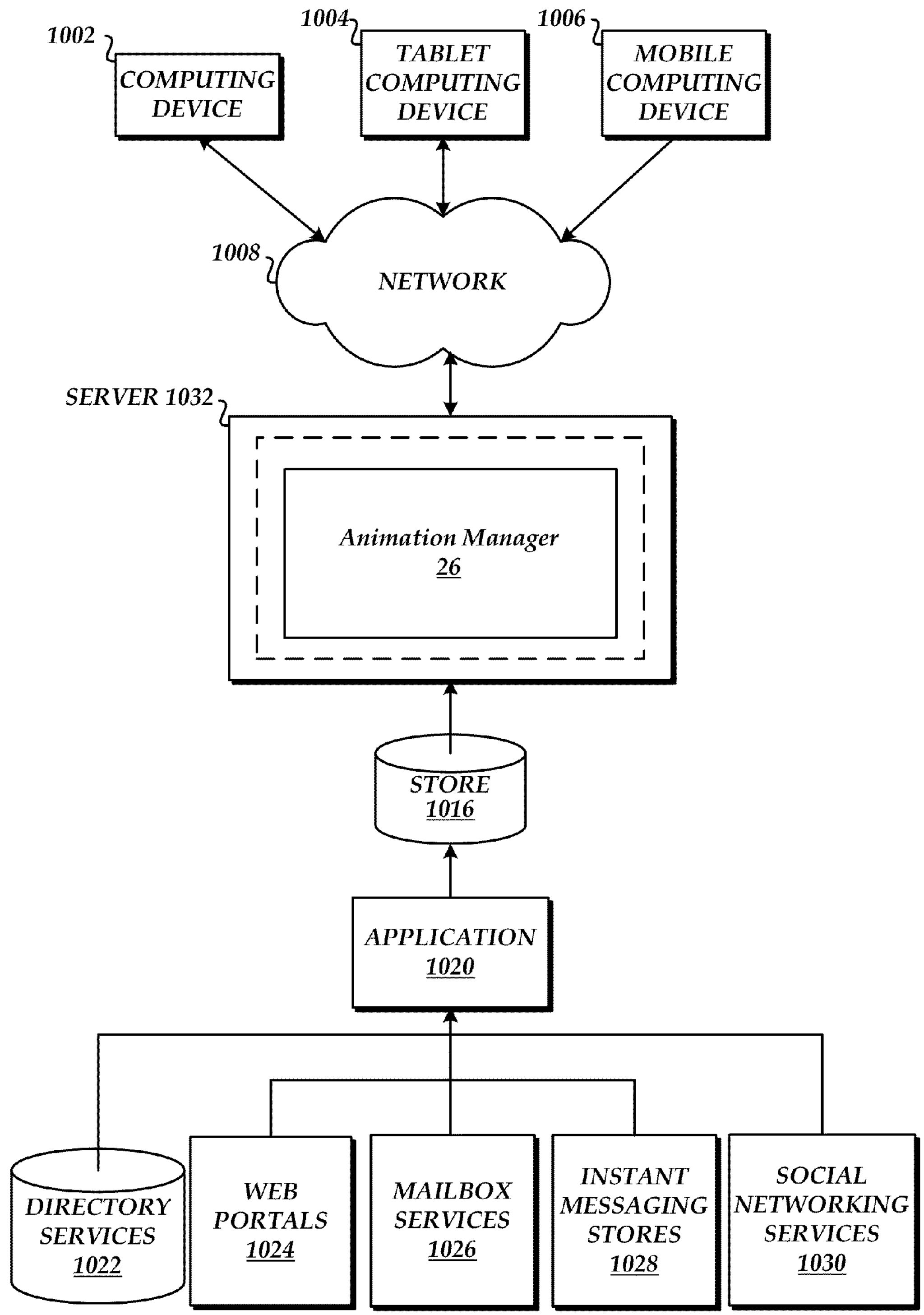
FIG. 6 illustrates a system architecture used in cross window animations.

FIG. 6 illustrates a system architecture used in cross window animations, as described herein. Content used and displayed by the application (e.g. application 1020) and the animation manager 26 may be stored at different locations. For example, application 1020 may use/store data using directory services 1022, web portals 1024, mailbox services 1026, instant messaging stores 1028 and social networking sites 1030. The application 1020 may use any of these types of systems or the like. A server 1032 may be used to access sources and to prepare and display cross window animations. For example, server 1032 may generate a cross window animation for application 1020 to display at a client (e.g. a browser or some other window). As one example, server 1032 may be a web server configured to provide productivity services (e.g. presentation, spreadsheet, word-processing, messaging, document collaboration, and the like) to one or more users. Server 1032 may use the web to interact with clients through a network 1008. Server 1032 may also comprise an application program (e.g. a presentation application, an application that uses animations, . . . ). Examples of clients that may interact with server 1032 and a presentation application include computing device 1002, which may include any general purpose personal computer, a tablet computing device 1004 and/or mobile computing device 1006 which may include smart phones. Any of these devices may obtain content from the store 1016.

FIGS. 7-10 show exemplary displays illustrating cross window animations. The examples shown herein are for illustration purposes and not intended to be limiting.

Figure 7:
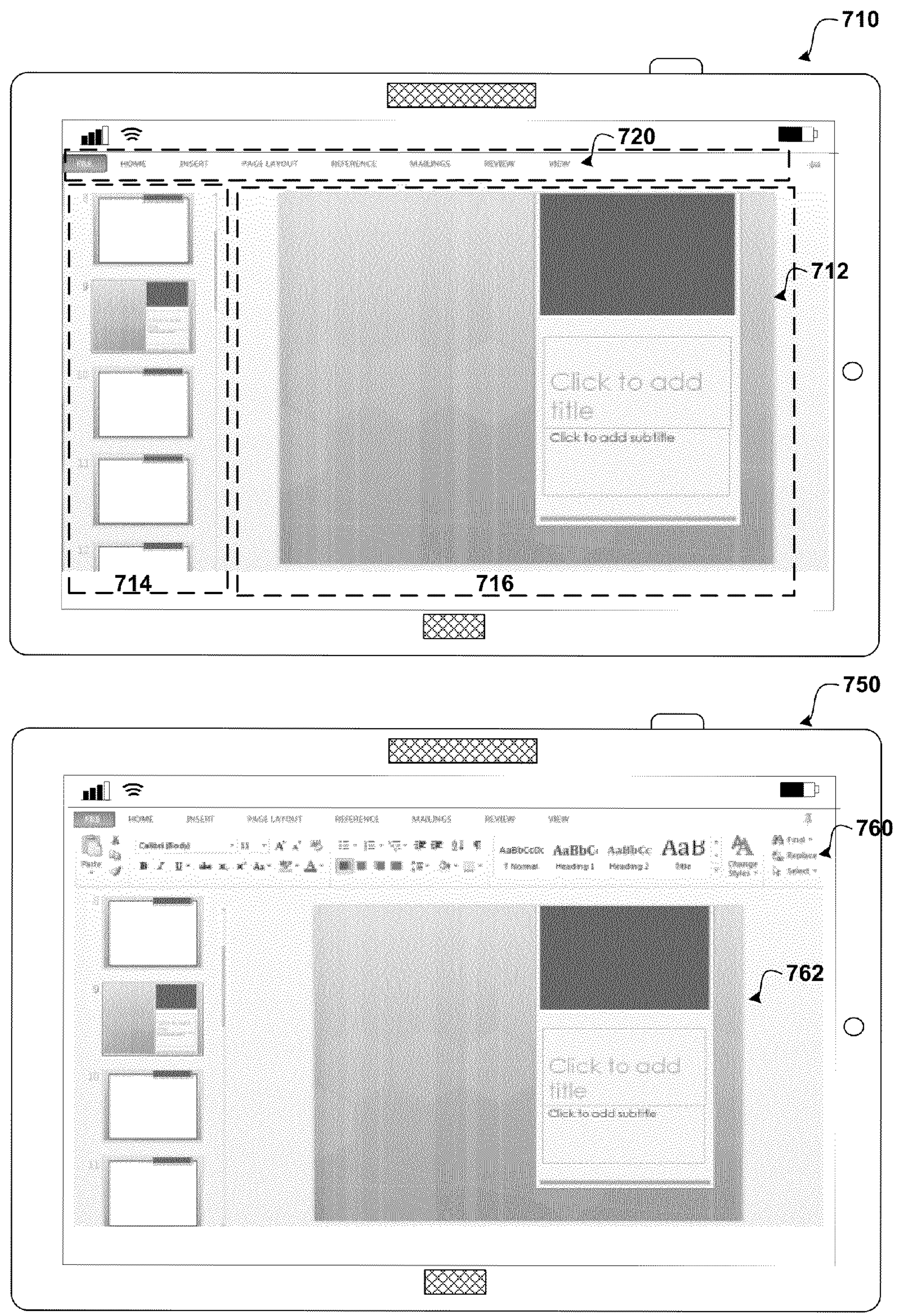

FIG. 7 shows an exemplary landscape slate display illustrating a cross window animation.

Display 710 shows a slate that displays a presentation slide 712. While display 710 appears to be displayed within a single window, many windows are used in the display. For example, window 720 may be used to display user interface elements, window 714 may be used to display thumbnails of the slides of a presentation and window 716 is used to display slide 712. When any animation appears to move from one window to another window, that animation is a cross window animation. In the current example, a cross window animation is performed when the user interface 760 is displayed. Display 710 shows an initial state before the animation and display 750 shows the final state after the cross window animation is performed.

If a cross window animation is not performed, the position changes of the different elements may appear to be jerky to a user. For example, instead of seeing a smooth resizing of the user interface window and the document window, the windows would appear jerky to a user when displayed at the determined size. As discussed above, the cross window animation is performed in an overlay window. Beneath the overlay window, the windows may have already changed in size/position, but the animation in the overlay window shows those changes in position/size smoothly. The overlay window smoothly animates the reposition/resizing. As the animation in the overlay window is occurring, changes that occur in the registered windows may also be redirected in real time, such that changes that occur in the registered underlying windows, the user still sees the animations of the content inside the underlying window.

FIG. 8 shows an exemplary landscape slate display illustrating a cross window animation.

Display 810 shows a slate that displays a presentation slide 820. While display 810 appears to be displayed within a single window, many windows may be used in the display. For example, a window may be used to display user interface elements, a window may be used to display other elements, a window may be used to display a document, and the like. In the current example, a cross window animation is performed in response to a user interaction. Display 810 shows an initial state before the animation and display 850 shows the final state after the cross window animation is performed.

As can be seen, the slide 820 has been shrunk and moved to appear within a different window/location and the contents of the document window have been replaced with content 860. The animation that is performed from initial display 810 to final display 850 may include different animation effects. For example, slide 820 may appear to smoothly shrink and move to slide position 820' as shown in display 850. Slide 820 may also appear to fade while content 860 appears within display 850. Generally, any animation effects may be applied during the transitions.

Figure 9:
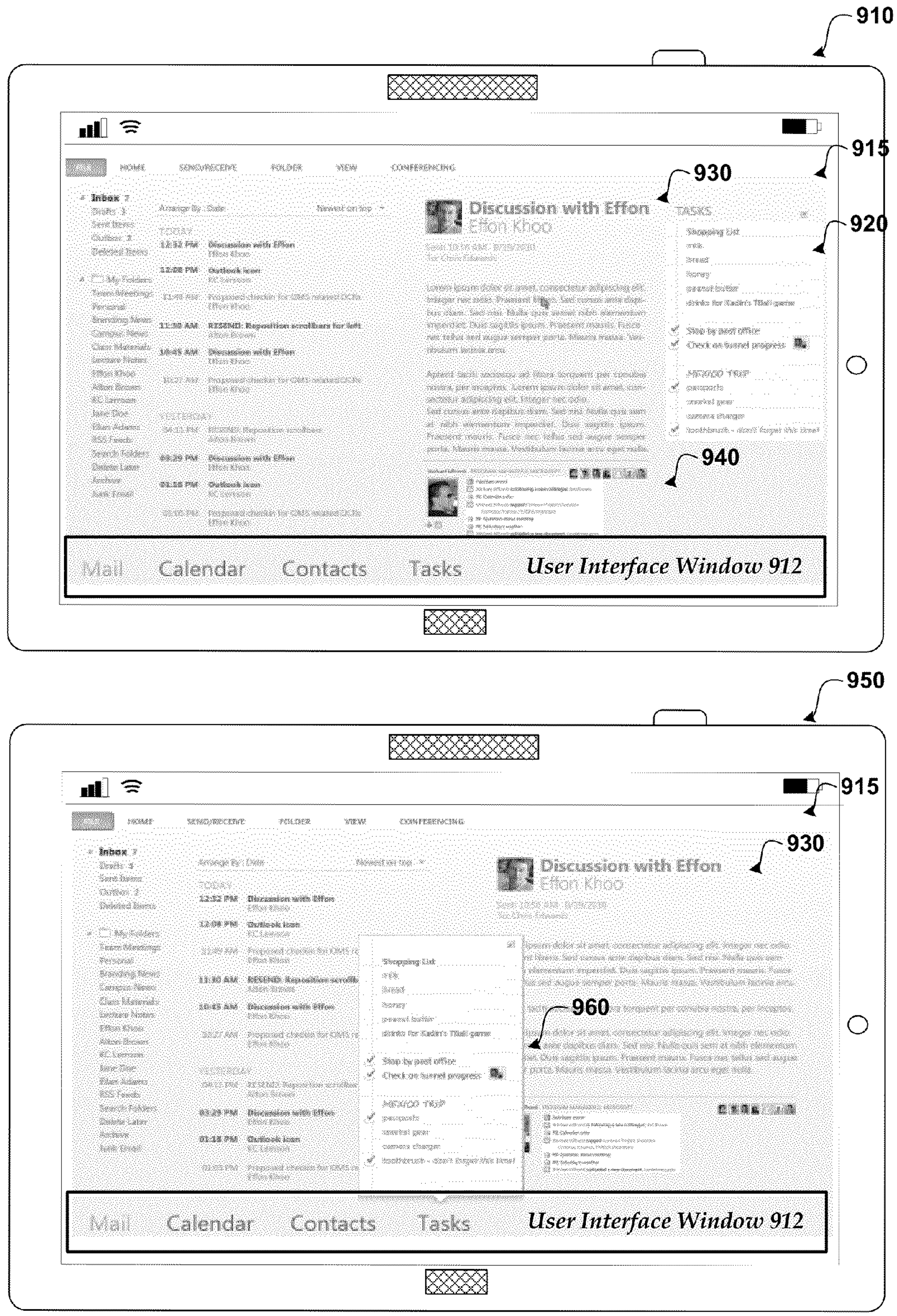

FIG. 9 shows an exemplary landscape slate display illustrating a cross window animation.

Display 910 shows a slate that displays content 915. While display 910 appears to be displayed within a single window, many windows may be used in the display. For example, a window 912 may be used to display user interface elements, a window 920 may be used to display tasks, a window 930 may be used to display a discussion, a window 940 may be used to display a social connector, and the like. In the current example, a cross window animation is performed in response to a user interaction. Display 910 shows an initial state before the animation and display 950 shows the final state after the cross window animation is performed.

As illustrated, in response to a user selecting a tasks UI element in window 912, window 960 is displayed, window 930 and 940 are repositioned and window 920 is removed from the display. One or more animations may be applied during the cross window animation.

Figure 10:
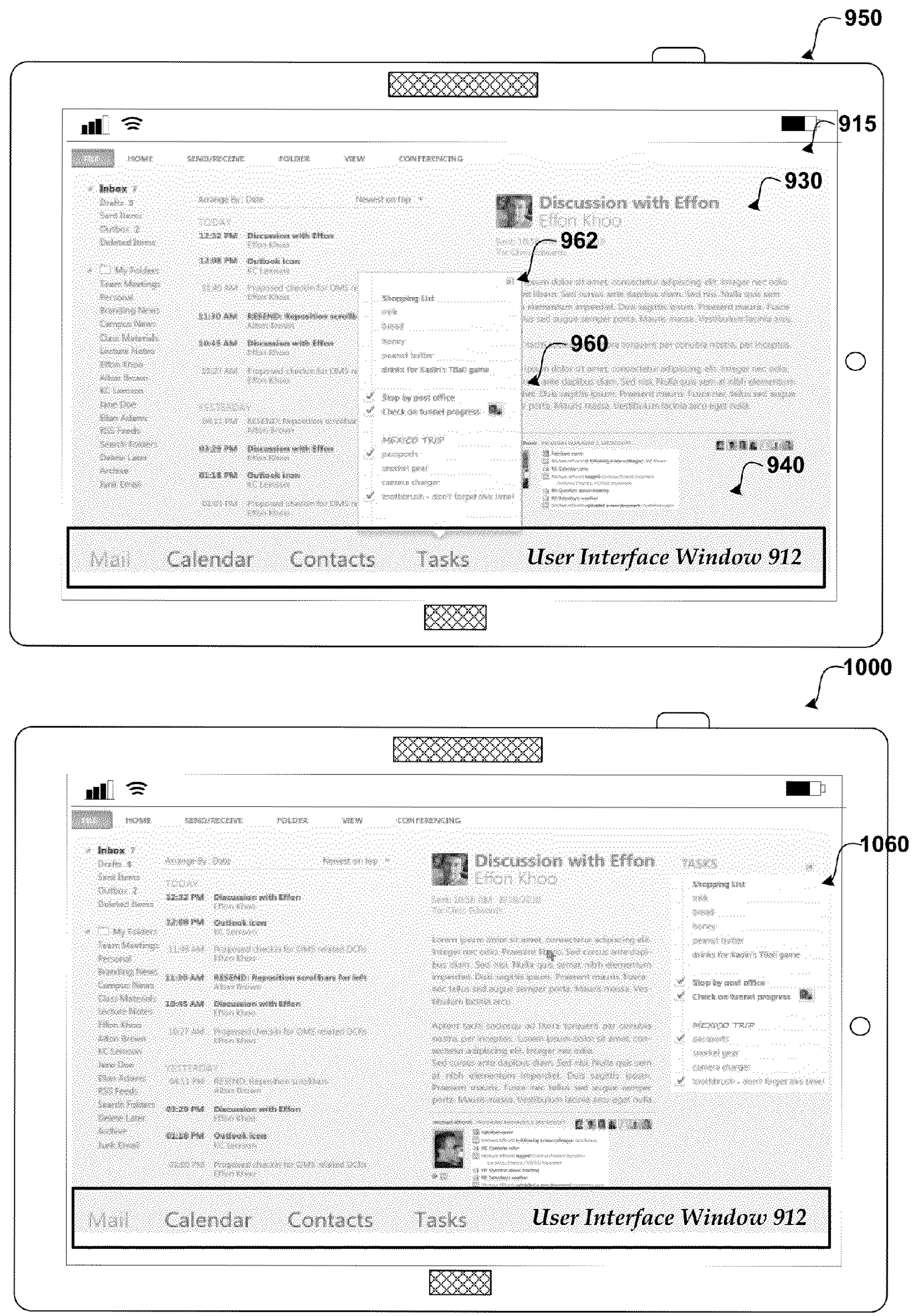

FIG. 10 shows an exemplary landscape slate display illustrating a cross window animation.

Display 950 shows a slate as illustrated in FIG. 9. While display 950 appears to be displayed within a single window, many windows may be used in the display. For example, a window 912 may be used to display user interface elements, a window 930 may be used to display a discussion, a window 940 may be used to display a social connector, a window 960 may be displayed to show options, and the like. In the current example, a cross window animation is performed in response to a user interaction with an element shown in window 960. Display 950 shows an initial state before the animation and display 1000 shows the final state after the cross window animation is performed.

As illustrated, in response to a user selecting a fly out element 962 in window 960, window 1060 is displayed, window 930 and 940 are repositioned and window 960 is removed from the display. One or more animations may be applied during the cross window animation.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for cross window animation, comprising:
determining an animation area that covers a portion of different windows;
creating an overlay window that is sized to cover the animation area;
displaying the overlay window over the portion of the different windows;
performing an animation using the overlay window, further comprising:
moving a layer from a first different window into the overlay window;
moving the layer within the overlay window such that the layer appears to cross from the first different window to a second different window; and
moving the layer from the overlay window into the second different window; and
removing the overlay window when the animation is complete.

2. The method of claim 1, wherein the animation is at least one of: an interwindow animation that animates a visual element over the different windows and a windows transition animation that comprises at least one of: changing a size of at least one of the different windows and moving at least one of the different windows.

3. The method of claim 2, further comprising receiving hints that specify information about the different windows that are affected in the windows transition animation, the hints comprising an initial window location, an initial window size, a final window location, a final window size, an initial window visibility, a final window visibility and a clipping region in the overlay window.

4. The method of claim 3, wherein the hints further comprise at least one of: a hint that specifies that the windows content's are a solid color, a hint that specifies that a window's contents will not change between initial and final states, a hint that specifies that a window is a control, a hint that the window will not be seen, and a resize hint that adds extra area to the overlay region.

5. The method of claim 2, further comprising adding a layer to the overlay window to move an element in the interwindow animation.

6. The method of claim 1, further comprising changing a parent of layers of the different windows to the overlay window.

7. The method of claim 6, further comprising changing the parent of layers back from the overlay window to the different windows after the animation is complete.

8. The method of claim 1, further comprising registering the different windows that are affected by the animation such that content from the registered windows is rendered to the overlay window during the animation.

9. The method of claim 1, further comprising blocking a user interface thread until at least one of: determining the animation is complete and determining when the animation exceeds a predetermined time period.

10. A system for cross window animation, comprising:
a display;
a network connection that is coupled to tenants of a multi-tenant service;
a processor and a computer-readable medium;
an operating environment stored on the computer-readable medium and executing on the processor; and
a process operating under the control of the operating environment and operative to perform actions, comprising:
determining an animation area that covers a portion of different windows;
creating an overlay window that is sized to cover the animation area;
displaying the overlay window over the portion of the different windows; and
performing an animation using the overlay window, wherein the animation is at least one of: an interwindow animation that animates a visual element over the different windows and a windows transition animation that comprises at least one of: changing a size of at least one of the different windows and moving at least one of the different windows, the animation further comprising:
moving a layer from a first different window into the overlay window;
displaying the layer within the overlay window such that the layer appears to cross from the first different window to a second different window; and
moving the layer from the overlay window into the second different window.

11. The system of claim 10, further comprising
removing the overlay window when the animation is complete.

12. The system of claim 10, further comprising changing a parent of layers of the different windows to the overlay window before performing the animation and changing the parent of layers back from the overlay window to the different windows after the animation is complete.

13. The system of claim 10, further comprising blocking a user interface thread until at least one of: determining the animation is complete and determining when the animation exceeds a predetermined time period.

14. A computing device operable for cross window animation, comprising:
a processor; and
a memory storage including instructions, which when executed by the processor are operable to provide:
determining an animation area that covers a portion of a first window and a portion of a second window;
creating an overlay window that is sized to cover the animation area, wherein the overlay window includes an opaque background displayed above the animation area;
displaying the overlay window over the portions of the first and second windows;
performing an animation using the overlay window, further comprising:
directing the first and second windows to draw content directly to the overlay window, thereby including the portion of the first window and the portion of the second window within the animation;
moving a visual element within the first window from the first window into the overlay window;
displaying the visual element within the overlay window such that the visual element appears to cross from the first window to the second window; and
moving the visual element from the overlay window into the second window.

15. The computing device of claim 14, wherein the instructions are further operable to provide removing the overlay window when performing the animation is complete.

16. The computing device of claim 14, wherein the instructions are further operable to provide:

changing a parent of the visual element from the first window to the overlay window before performing the animation; and changing the parent of the visual element from the overlay window to the second window after the animation is complete.

17. The computing device of claim 14, wherein the instructions are further operable to provide:

registering, before performing the animation, a window that is affected by the animation; and rendering content to the overlay window during the animation, such that content from the registered window is rendered and content from a window that is not registered is not rendered.

18. The computing device of claim 14, wherein the animation is at least one of: an interwindow animation that animates the visual element over the first and second windows and a windows transition animation that comprises at least one of: changing a size of at least one of the first and second windows and moving at least one of the first and second windows.

19. The computing device of claim 14, wherein the instructions are further operable to provide:

blocking a user interface thread until at least one of: determining the animation is complete and determining when the animation exceeds a predetermined time period.

20. The computing device of claim 14, wherein the instructions are further operable to provide:

adding a layer to the overlay window to move the visual element.

* * * * *